(12) United States Patent
Swaminathan et al.

(10) Patent No.: US 10,027,992 B2
(45) Date of Patent: Jul. 17, 2018

(54) RESIDUAL ENTROPY COMPRESSION FOR CLOUD-BASED VIDEO APPLICATIONS

(71) Applicant: Adobe Systems Incorporated, San Jose, CA (US)

(72) Inventors: Viswanathan Swaminathan, Saratoga, CA (US); Saayan Mitra, San Jose, CA (US); Akshay Malhotra, Arlington, TX (US)

(73) Assignee: Adobe Systems Incorporated, San Jose, CA (US)

( * ) Notice: Subject to any disclaimer, the term of this patent is extended or adjusted under 35 U.S.C. 154(b) by 90 days.

(21) Appl. No.: 14/964,715

(22) Filed: Dec. 10, 2015

(65) Prior Publication Data

US 2017/0171564 A1 Jun. 15, 2017

(51) Int. Cl.
*H04N 7/12* (2006.01)
*H04N 19/94* (2014.01)
*H04N 19/91* (2014.01)
*H04N 21/274* (2011.01)
*H04N 19/46* (2014.01)

(52) U.S. Cl.
CPC ............. *H04N 19/94* (2014.11); *H04N 19/46* (2014.11); *H04N 19/91* (2014.11); *H04N 21/274* (2013.01)

(58) Field of Classification Search
CPC ...................................................... H04N 19/94
USPC .................................................... 375/240.22
See application file for complete search history.

(56) References Cited

U.S. PATENT DOCUMENTS

2004/0174278 A1* 9/2004 Kadono ............ G11B 20/1426
341/67
2017/0063392 A1* 3/2017 Kalevo ................... H03M 7/40

OTHER PUBLICATIONS

Blelloch, Guy E., "Introduction to Data Compression," Computer Science Department, Carnegie Mellon University, Jan. 31, 2013. 55 pages.

(Continued)

*Primary Examiner* — Richard Torrente
(74) *Attorney, Agent, or Firm* — Finch & Maloney PLLC

(57) ABSTRACT

Residual vectors are compressed in a lossless compression scheme suitable for cloud DVR video content applications. Thus, a cloud DVR service provider can take many copies of the same file stored in the cloud and save storage space by compressing those copies while still maintaining their status as distinct copies, one per user. Vector quantization is used for compressing already-compressed video streams (e.g., MPEG streams). As vector quantization is a lossy compression scheme, the residual vector has to be stored to regenerate the original video stream at the decoding (playback) node. Entropy coding schemes like Arithmetic or Huffman coding can be used to compress the residual vectors. Additional strategies can be implemented to further optimize this residual compression. In some embodiments, the techniques operate to provide a 25-50% improvement in compression. Storage space is thus more efficiently used and video transmission may be faster in some cases.

14 Claims, 10 Drawing Sheets

(56) References Cited

OTHER PUBLICATIONS

Blelloch, Guy, "Algorithms in the Real World: Lecture Notes (Fall 1997)," Apr. 23, 1998. 303 pages.
Shahbahrami, et al., "Evaluation of Huffman and Arithmetic Algorithms for Multimedia Compression Standards," Retrieved from the Internet—Nov. 1, 2015. URL: http://arxiv.org/ftp/arxiv/papers/1109/1109.0216.pdf. 11 pages.
Wagner, David, "CS 170: Efficient Algorithms and Intractable Problems," Handout 16, UC Berkeley, Apr. 1, 2003. 4 pages.

* cited by examiner

| Metadata 109 |
|---|
| Length of Codebook Index |
| Length of Residual |
| Number of Dimensions in Residual |
| Length of Each Non-zero Dimension |
| Location of Each Non-zero Dimension |
| Dimension Sign |
| Codebook ID |

Codebook 105

| Codebook Index | Codebook Vector |
|---|---|
| 0 0 ....0 0 0 | -5 -5 -5 .... -5 -5 -5 |
| 0 0 ....0 0 1 | -5 -5 -5 .... -5 -5 -4 |
| 0 0 ....0 1 0 | -5 -5 -5 .... -5 -5 -5 |
| 0 0 ....0 1 1 | -5 -5 -5 .... -5 -5 -1 |
| ⋮ | ⋮ |
| 1 1 ...1 0 1 | 5 5 5 ....5 5 3 |
| 1 1 ...1 1 0 | 5 5 5 ....5 5 4 |
| 1 1 ...1 1 1 | 5 5 5 ....5 5 5 |

|  | | | | | | | | | | | | |
|---|---|---|---|---|---|---|---|---|---|---|---|---|
| Media Data | Input Vector: | 0 | 2 | 0 | 0 | 1 | 3 | 2 | 0 | 1 | 3 | 0 |
| | Codebook Vector: | -4 | 1 | 0 | 0 | 1 | -2 | 2 | 0 | 0 | 5 | 0 |
| | Residual (difference): | 4 | 1 | 0 | 0 | 0 | 5 | 0 | 0 | 1 | -2 | 0 |
| | Zero Removal: | 4 | 1 | | | | 5 | | | 1 | -2 | |
| | Optimized Residual: | 100 | 1 | | | | 101 | | | 1 | 10 | |
| | Codebook Index: | 0 1 1 1 1 0 1 1 1 1 1 0  (from codebook) | | | | | | | | | | |
| Metadata | Dimension Location and Length for Non-zeros: | 3 | 1 | 0 | 0 | 0 | 3 | 0 | 0 | 1 | 2 | 0 |
| | Dimension Sign: | - | + | + | + | + | + | + | + | + | - | + |
| | Codebook ID: | CB-77 | | | | | | | | | | |
| | Codebook Index Length: | 12 bits | | | | | | | | | | |
| | Residual Length (un-optimized): | 16 bits | | | | | | | | | | |
| | Residual Length (optimized): | 10 bits | | | | | | | | | | |
| | Number of Dimensions in Residual: | 11  (6 of which are zeros, at positions: 3-5, 7, 8, and 11) | | | | | | | | | | |

Fig. 4a

Vector-wise Huffman Table

| Huffman Code | Input Value (key) |
|---|---|
| 1 | 1 |
| 01 | 101 |
| 001 | 101001 |
| ... | ... |
| 000101 | 100 1 101 1 10 | ← Match
| ... | ... |
| 0000101011 | 100 1 101 1 10 011101 |

Fig. 4b

Vector-wise Huffman Table (non-prefix)

| Huffman Code Length | Huffman Code | Input Value (key) |
|---|---|---|
| 1 | 0 | 1 |
| 1 | 1 | 101 |
| 2 | 01 | 101001 |
| ... | ... | ... |
| 4 | 1010 | 100 1 101 1 10 | ← Match
| ... | ... | ... |
| 4 | 1101 | 100 1 101 1 10 011101 |

Metadata ← Length of Residual Vector (optimized + Huffman)

Media Data ← Encoded Optimized Residual Vector

Fig. 4c

RESIDUAL ENTROPY COMPRESSION FOR CLOUD-BASED VIDEO APPLICATIONS

FIELD OF THE DISCLOSURE

This disclosure relates to techniques for video processing, and more particularly, to techniques for carrying out optimized coding and storage of compressed video content.

BACKGROUND

In general, data compression reduces the size of a digital file. A compression algorithm typically makes the digital file smaller by representing strings of bits (i.e., logical 1s and 0s), which make up the digital file, with smaller strings of bits by using a dictionary, or so-called codebook. This reduction typically happens at the encoding stage prior to transmission or storage. So, when such a reduced-size string is received at the decoding stage for playback, the decoding algorithm uses the codebook to reconstruct the original content from the compressed representation generated by the encoding algorithm. Whether the reconstructed content is an exact match of the original content or an approximation thereof depends on the type of compression employed. Lossless compression algorithms allow the original content to be reconstructed exactly from the compressed message, while lossy compression algorithms only allow for an approximation of the original message to be reconstructed. Lossless compression algorithms are typically used where data loss of original content is problematic (such as the case with executable files, text files, and digital data files where loss of even a single bit may actually change the meaning of the content). Lossy compression algorithms are typically used for images, audio, video, and other such digital files where a degree of intentional data loss is imperceptible or otherwise at an acceptable level. With respect to lossy compression, note that the bit loss is not random; rather, the loss is purposeful (bits representing imperceptible sound or visual distinctions or noise can be targeted for exclusion by the lossy compression algorithm).

Data compression is commonly used in applications where the storage space or bandwidth of a transmission path is constrained. For example, images and video transmitted via a communication network such as the Internet are typically compressed. One such example case is the so-called "cloud DVR" service, which allows for streaming of compressed digital video content from a remote digital video recorder to a user's playback device, such as a television, desktop or laptop computer, tablet, smartphone, or other such playback device. A standard compression scheme for streamed video is MPEG compression, although there are numerous other compression standards that can be used. In any case, because the content is stored in the cloud-based DVR, the user doesn't need to have the content maintained in a storage local to the playback device. As will be further appreciated, because compression makes the given digital file smaller (i.e., fewer bits), that file can be stored using less memory space and transmitted faster, relative to storing and transmitting that file in its uncompressed state. However, there are a number of non-trivial problems associated with cloud-based DVR services. One such problem is related to the legal requirement that each user's recordings stored in the cloud DVR must be a distinct copy associated with that user only. In another words, even though multiple users have recorded the same program (some piece of digital content), the cloud DVR service provider is required to save a single copy of that program for each of those users. Thus, a storage-conserving technique such as data deduplication, which avoids content storage redundancy by leveraging a common copy of content that is accessible to all users by operation of a pointer-based system, is unacceptable where the one copy per user requirement applies. This requirement of a single copy per user is based in copyright laws related to the right of an individual to legally record content for purpose of time-shifting the personal viewing of that content. Thus, even with compression schemes in place, a content service provider that is tasked with providing the same content item to multiple users may still be constrained from a storage perspective.

BRIEF DESCRIPTION OF THE DRAWINGS

FIG. 4a is a table illustrating encoding of an example input vector in accordance with an embodiment of the present disclosure.

FIG. 4b illustrates a table that can be used for encoding a residual with vector-wise Huffman encoding in accordance with an embodiment of the present disclosure.

FIG. 4c illustrates a table that can be used for encoding a residual with vector-wise non-prefix Huffman encoding in accordance with an embodiment of the present disclosure.

DETAILED DESCRIPTION

Figure 1A:
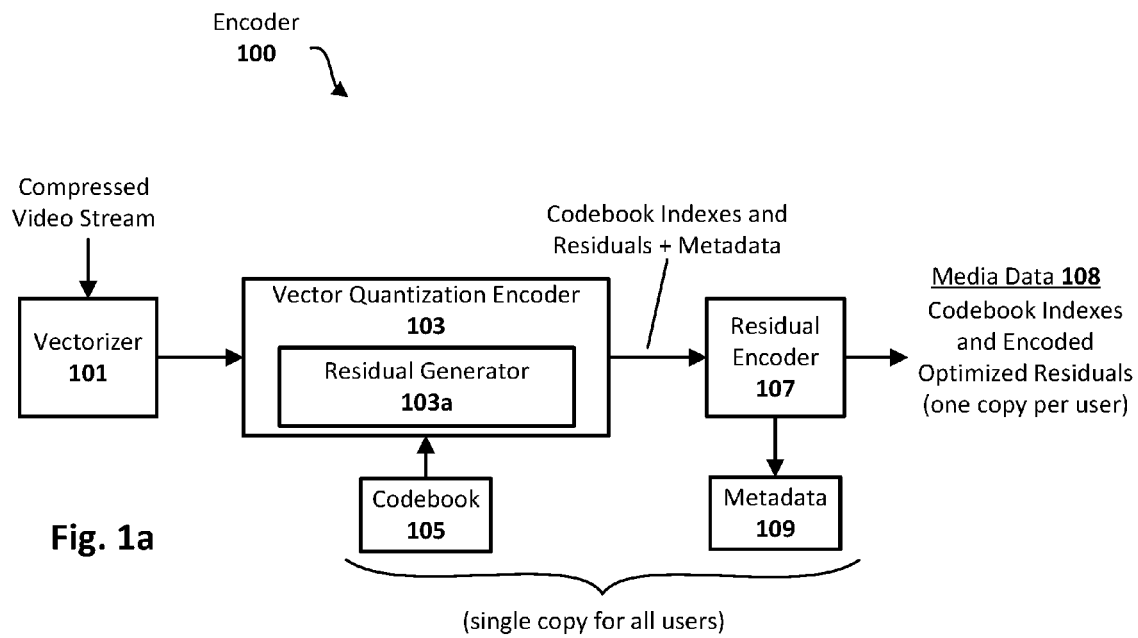
FIG. 1a illustrates block diagram of an encoder configured in accordance with an embodiment of the present disclosure.

Techniques are disclosed for carrying out optimized coding of compressed video content. Once coded, the content can be more efficiently stored (i.e., use less storage space). Given this storage efficiency, the techniques are particularly helpful in storage-intensive applications, such as those where content storage is subject to a one copy per user requirement. In accordance with an embodiment, the techniques include vectorization of a given compressed video stream by breaking the stream into smaller chunks of 1s and 0s (i.e., vectors). This vectorization process is followed by codebook-based vector quantization to generate residual vectors. As is known, the vector quantization process involves comparing the input vectors to vectors of a given codebook. As is further known, the more representative the codebook is of the input vectors, the smaller the residual vectors will tend to be (i.e., a residual vector represents a mathematical difference between a given input vector and the most similar codebook vector). Elements, also referred to as dimensions, of a given residual vector having a zero value are then removed or otherwise ignored, thereby optimizing the residual vector by making it smaller. Each optimized residual vector is then entropy coded (e.g., Huffman coded or Arithmetic coded). The result of the entropy encoding process is encoded optimized media data, which can be stored using less memory, and in some cases, may be subsequently streamed more rapidly to the user for playback. In addition, metadata knowable from the encoding process is collected and stored separately from the encoded optimized media data. The metadata identifies or otherwise includes data that facilitates decoding of the encoded optimized media. In one embodiment, for instance, the metadata identifies the total number of dimensions in the un-optimized residual vector and the length of each non-zero dimension, along with other data useful in the decoding process, such as the length of the corresponding codebook index, the total length of the residual vector (including all dimensions, both zeros and non-zeros), the codebook identifier (assuming there is more than one codebook), and the sign of the residual vector elements. As will be appreciated in light of this disclosure, not all such metadata is needed; rather, only metadata needed to facilitate decoding need be logged, which can vary from one embodiment to the next. To this end, the listing of example metadata here is not intended to limit the present disclosure to an embodiment that includes all such metadata; rather, other embodiments may include any piece or combination of such metadata, so long as space saving encoding/decoding as variously provided herein can be achieved. As will be further appreciated in light of this disclosure, such metadata allows the entropy coding to be carried out using fewer bits, especially when the vector codebook is a close representation of the digital content being coded and therefore causes a high number of zero dimensions in the residual vectors. Hence a greater degree of lossless compression can be achieved. As such, a content provider can save more storage space, which is particularly helpful to providers subject to the one copy per user requirement. Further note that, while the encoded optimized media data can be replicated and stored for each user as may be required by governing authorities (such that each user is associated with a distinct copy of the media portion of the video content), only a single common copy of the metadata portion is needed. In addition, in some example embodiments where compressed residuals are actually transmitted to the playback node, a content provider may be able to stream that content faster. In such example embodiments, the requisite codebook and metadata can be provided to the playback node (either in advance, or contemporaneously with encoded compressed video stream) to facilitate the decoding process. In other example embodiments, however, decoding is carried out at the transmitting node, such that the stream transmitted to the playback node is the original decoded compressed video stream (or relatively close representation thereof). In contrast, existing solutions might stream slower or otherwise take longer to deliver standard compressed video content.

System Architecture

FIG. 1a illustrates block diagram of an encoder 100 configured in accordance with an embodiment of the present disclosure. As can be seen, the encoder 100 includes a vectorizer 101, a vector quantization encoder 103 and codebook 105, and a residual encoder 107. The vector quantization (VQ) encoder 103 includes a residual generator 103a. At a high level, the encoder 100 is configured to receive a compressed video stream and to output media data 108 that generally includes encoded optimized residuals and corresponding codebook indexes. This output can be stored for multiple users, such that there is one distinct copy of media data 108 per user. In some embodiments, only a portion of the media data 108 is subject to the one copy per user requirement. For instance, in one example such case only the codebook index is stored multiple times (one distinct copy per user) and the optimized residual is only stored once. Other variations of a one copy per user scheme that may be compliant with the relevant applicable standards and legal requirements can be used as well. In addition, the encoder 100 also provides metadata 109 which can be stored as a single copy, along with the codebook 105, so that they are available for decoding the optimized residuals prior to transmission or at the playback node, as will be explained in turn. Other embodiments may be configured differently but still provide a similar functionality. For instance, in another embodiment, the vectorizer 101 may be integrated with the VQ-encoder 103. Likewise, the residual encoder 107 may be integrated with the VQ-encoder 103. The degree of integration can vary from one embodiment to the next. Further note that, in some embodiments, encoding can take place on a transmitting (content provider) node and decoding can take place on the receiving (playback) node, such that an encoded compressed video stream is transmitted. Alternatively, encoding and decoding both take place at the transmitting node, so that a normal (not encoded) compressed video stream is transmitted. Numerous variations will be apparent and the present disclosure is not intended to be limited to any particular one.

The vectorizer 101 can be implemented using standard vectorization technology. In one example embodiment, vectorizer 101 is configured to receive an MPEG-compressed video stream and to divide that stream up into discrete vectors having a known length. As will be appreciated, MPEG compression is used herein in a generic fashion, and is intended to include all typical use cases, including those where the audio and video of a given media file is compressed by one of the standards that the Moving Picture Experts Group (MPEG) has promulgated (such as MPEG-1, MPEG-2, or MPEG-4) and multiplexed using the MPEG-2 transport stream standard. However, as will be further appreciated in light of this disclosure, any ISO (International Organization for Standardization) or ITU (International Telecommunication Union) standard, or other such standards, can be used instead of MPEG and the stream may or may not be multiplexed. So, in a more general sense, the vectorizer 101 can be configured to receive any type of compressed video stream, regardless of the compression standard used.

Figure 2A:
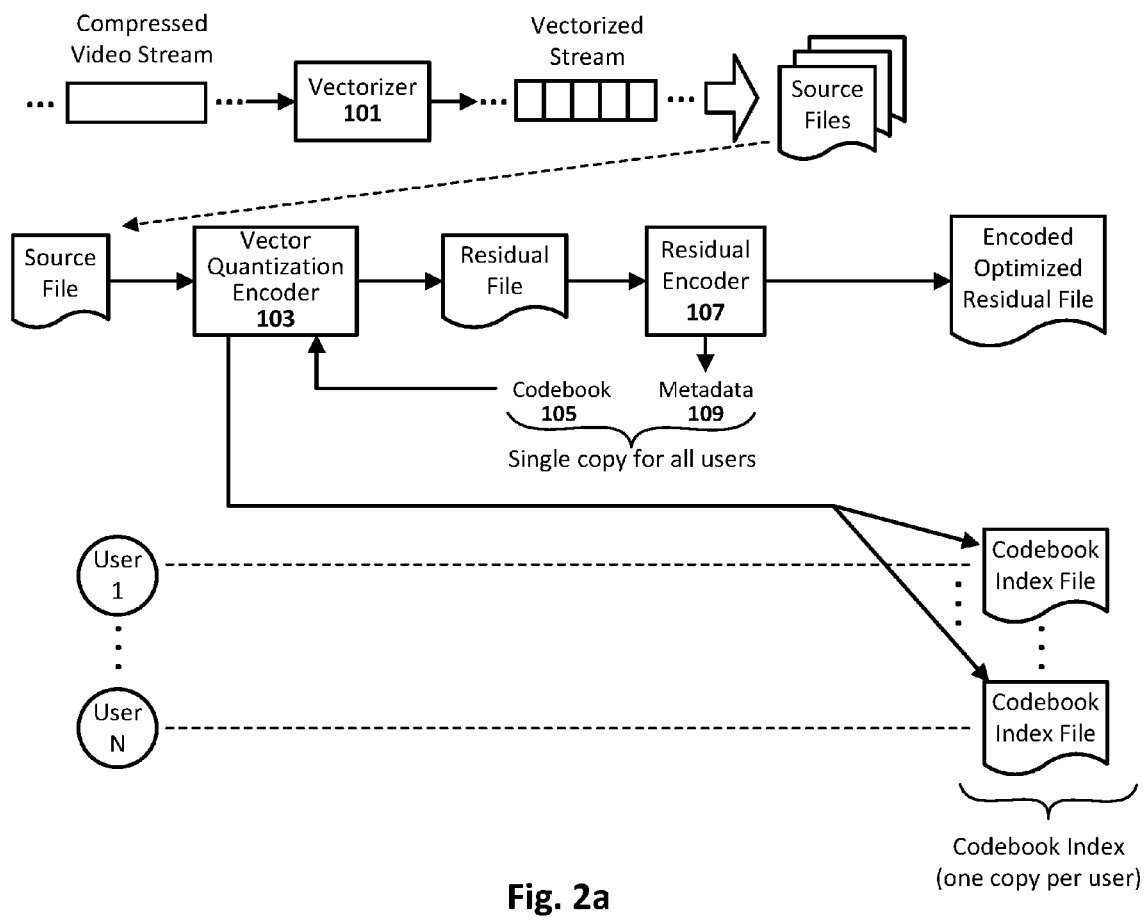
FIG. 2a illustrates example process flow on a content encoder, in accordance with an embodiment of the present disclosure.

The vectorization can be carried out at any resolution, and generally depends on the desired number of elements or so-called dimensions per vector. In some example embodiments, each vector includes ten to twenty dimensions or elements, with one specific embodiment having eleven dimensions per vector. FIG. 2a visually depicts this vectorization process, showing a continuous compressed video stream processed into a set of discrete sequential vectors. As can further be seen, each vector can be treated as a separate and distinct source file. As will be explained in turn, these source files are processed through the encoder 100, using vector quantization and optimized residual entropy coding.

The vectors or source files generated by the vectorizer 101 are provided to the VQ-encoder 103, which carries out the vector quantization process on those vectors/source files. Vector quantization is a lossy compression scheme used to encode/decode MPEG video streams, and is generally implemented by mapping input vectors from a given multidimensional input space into a smaller dimensional subspace using a set of representative code vectors maintained as a codebook. Such a vector codebook can be trained to improve its representativeness of the digital content being compressed. Thus, by virtue of encoding values from a multidimensional vector space into a finite set of values of a discrete subspace of lower dimension, the vector quantization process carried out by the VQ-encoder 103 allows for a relatively large data set to be fairly well represented by a smaller data set and hence compression is achieved. So, with further reference to FIGS. 1a and 2a, the VQ-encoder 103 identifies the closest representative codebook vector in the given codebook 105 (by way of Euclidean norms of the vectors being compared, or other suitable vector comparison technique). The difference between that selected codebook vector and the input vector (from vectorizer 101) is generated by the residual generator 103a, and this difference is referred to as a residual vector or file. The residual vector/file can then be stored or otherwise made available for subsequent processing. This subsequent process generally includes optimizing and entropy coding the residual vector to further increase compression, as will be explained in turn. Further note that the index of the corresponding representative codebook vector selected from codebook 105, used to generate that residual vector, can be stored as well. This will allow for retrieval of the same codebook vector from the codebook 105, when decoding is carried out.

The codebook 105 can be implemented as conventionally done. In some embodiments, codebook 105 is static in nature, such that it is previously trained on a relevant set of content channels of the content provider and then deployed for use by the encoder 100 (and decoder 110). In other embodiments, the codebook 105 may be more dynamic in nature where training and refining of the codebook representative code vectors is ongoing. An example codebook 105 is shown FIG. 1d. Note the size (and hence, resolution) of the codebook can vary greatly from one embodiment to the next. In a general sense, the greater the resolution of the codebook 105 (i.e., the higher the number of distinct indexed codebook vectors), the greater the representativeness of the targeted multidimensional space (video content library of service provider) being subjected to vector quantization. The greater the representativeness of the targeted multidimensional space, the smaller in value the residual vectors will be. Said differently, the more representative a given codebook vector is of a given input vector, the lower the number of non-zero dimensions is in the resulting residual vector. The lower the number of non-zero dimensions in the resulting residual vector, the greater the degree of compression that can be applied to that residual (by zero removal and entropy coding).

Once the residual vector for a given input vector or source file is computed by the VC-encoder 103, that residual vector and corresponding codebook vector index are provided to the residual encoder 107, as shown in FIG. 1a. In other embodiments, note that the residual encoder 107 need not receive the codebook vector indexes, such as the example case shown in FIG. 2a. In any case, the residual encoder 107 can implement any number of entropy coding schemes, such as Arithmetic or Huffman coding, to compress the residual vectors. The reference to entropy refers to the notion that the residual vectors tend to have lower entropy than the original vectors received in the vectorized compressed video stream (from vectorizer 101), because logical 0s and low value dimensions tend to have high probabilities and high dimension values tend to have low probabilities. Thus, each residual vector (sometimes referred to as a residual file, as shown in FIG. 2a) received from the VQ-encoder 103 is evaluated by the residual encoder 107 for metadata and then optimized prior to entropy coding that residual vector.

In particular, metadata 109 associated with the given residual vector is identified and logged by the residual encoder 107. Thus, that metadata 109 can subsequently be made available to the decoding process. As will be appreciated in light of this disclosure, having the metadata 109 available in this way allows the entropy coding scheme to be simplified, according to some embodiments. As previously indicated, only a single copy of metadata 109 is needed. FIG. 1c shows an example set of metadata 109, according to one embodiment. As can be seen, the metadata 109 in this example set includes or otherwise provides a basis for determining: length of the codebook index corresponding to the representative codebook vector; length of the residual vector (un-optimized); number of dimensions in the residual vector (un-optimized); length of each non-zero dimension of the residual vector; location of each non-zero dimension of the residual vector (location within the overall vector); the sign of each dimension in the residual vector, and the codebook identity (ID).

A zero removal process by the residual encoder 107 provides an optimized residual vector. So, for instance, given a residual vector of {4 1 0 0 0 5 0 0 1 -2 0} from VQ-encoder 103, the optimized version of that residual vector would be {4 1 5 1 -2}. As further indicated in FIG. 1c, the metadata 109 may also (or alternatively) include data about the optimized residual vector, such as the length of the residual vector (optimized). As previously explained, other embodiments may include fewer pieces of metadata 109, such as only the number of dimensions in the residual vector (un-optimized) and the length and location of each non-zero dimension of the residual vector, assuming the other noted pieces of metadata 109 are either determinable or are otherwise not applicable or needed for decoding. For instance, in some embodiments, the dimension sign may not be applicable if only one polarity is used; similarly, if only one codebook is used, then codebook ID is not necessary; likewise, if the applicable codebook indexes are all the same size or otherwise known from the codebook, then length of the codebook index is not necessary (rather, it is already known); likewise, note that there is no need to actually store the location of the non-zero dimensions if the length of the zero dimensions is stored in the metadata 109 as a zero (in such cases, the metadata effectively includes the length of each dimension of the coded optimized residual vector, including both zero and non-zero dimensions, and hence the location of each type is determinable); likewise, metadata about the un-optimized residual may not be needed in some embodiments (such as the case where the metadata includes the length of the optimized residual vector rather than the length of the un-optimized residual vector). In still further specific embodiments employing a prefix-free entropy coding scheme (as will be explained in turn with reference to FIGS. 4c-d), only the length of the dimensions and/or overall length of the entropy coded residuals are stored as metadata 109, and the residual lengths per dimension (before entropy encoding) and lengths of the un-optimized residual vector are not stored as metadata. Numerous variations will be apparent in light of this disclosure, and metadata 109 can be reduced, supplemented, or modified so that it includes any metadata needed to achieve an optimized coding scheme as provided herein. The optimized residual vector can be entropy encoded in various ways, as will be discussed in more detail in turn.

The entropy coding scheme executed by the residual encoder 107 can vary from one embodiment to the next. Examples include Arithmetic coding and Huffman coding. However, because metadata 109 is stored and made available to the decoding process, the entropy coding scheme can be optimized and the coding tables can be smaller. So, for instance, and continuing with the previous example residual vector of {4 1 0 0 0 5 0 0 1 −2 0}, the optimized version of that residual vector would be {4 1 5 1 −2}. Applying decimal-to-binary conversion, the resulting optimized residual would be {100 1 101 1 10}. The dimension signs and lengths can be recorded into metadata 109. In some embodiments, this binary value {100 1 101 1 10} can then be used as an index or key into a Huffman table to find the corresponding Huffman code. Alternatively, each of the five dimensions can be treated as five input symbols presented for standard Arithmetic coding. Additional details of example entropy coding schemes will be further discussed with reference to FIGS. 3a-c and 4a-d. In any case, the output of the residual encoder 107 (and hence the output of the encoder 100) includes media data 108 and metadata 109.

As further indicated in FIG. 1a, the metadata 109 and other non-media data such as codebook 105 can be stored as a single common copy. In contrast, the media data 108 can be replicated so as to satisfy the one copy per user requirement, if applicable. Recall, the media data 108 generally includes the codebook indexes and the encoded optimized residuals. Further recall, however, that not all media data 108 may need to be subjected to the one copy per user requirement, depending on applicable standards and legal requirements. For instance, as further shown in the example embodiment of FIG. 2a, only the codebook indexes are stored under the one copy per user regime, and the corresponding encoded optimized residual is only stored once. Other such variations targeting compliance with a set of rules will be apparent in light of this disclosure.

Figure 1B:
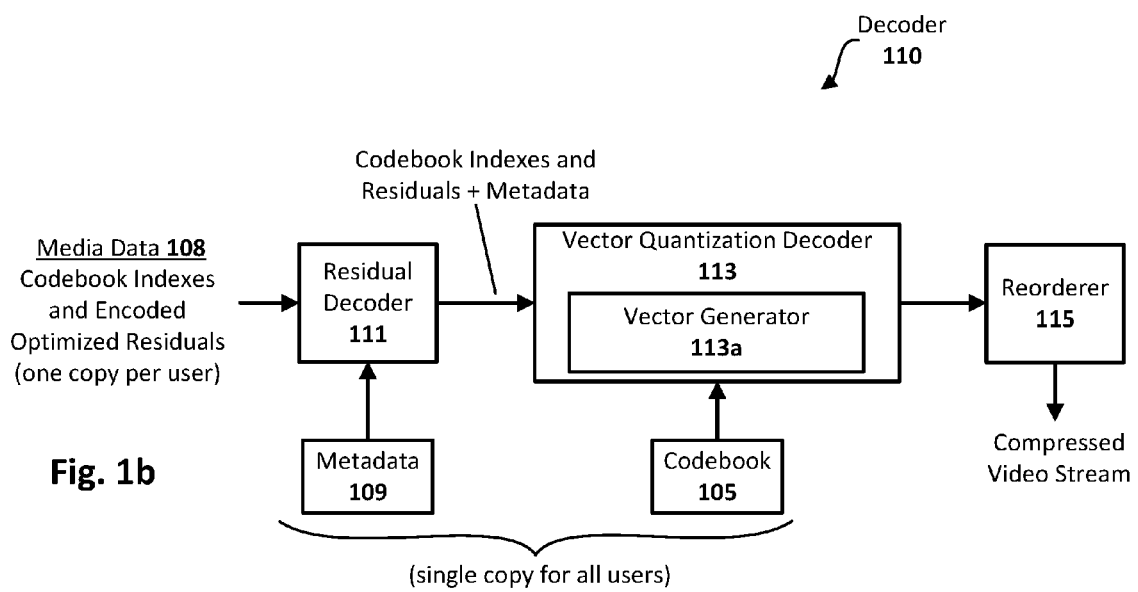
FIG. 1b illustrates block diagram of a decoder configured in accordance with an embodiment of the present disclosure.
Figures 1C, 1D:
FIG. 1c illustrates example metadata that can be stored for a given optimized residual (which may be collected before entropy coding and/or after entropy coding), in accordance with an embodiment of the present disclosure.
FIG. 1d illustrates an example codebook.

FIG. 1b illustrates block diagram of a decoder 110 configured in accordance with an embodiment of the present disclosure. As will be appreciated, the decoder 110 provides functionality that is complementary to the encoder 100, and to this end discussion with respect to decoding is kept concise and the previous relevant discussion regarding the encoder 100 is equally applicable here. As can be seen in FIG. 1b, the decoder 110 includes a residual decoder 111 (complementary to residual encoder 107), a vector quantization (VQ) decoder 113 (complementary to VQ-encoder 103) and codebook 105 (which is the same), and a reorderer 115 (complementary to vectorizer 101). The VQ-decoder 113 includes a vector generator 113a (complementary to residual generator 103a). Further note that the decoder 110 may actually be on the same node as the encoder 100, such as in applications where the compression techniques provided herein are being used to improve storage efficiency rather than transmission speed. However, in other embodiments, the decoder 110 can be implemented at a receiving node remote to the transmitting node, such that storage efficiency at the transmitting node as well as faster transmission speed from the transmitting node to the receiving node may be achieved if so desired.

At a high level, the decoder 110 is configured to receive encoded media data 108 that generally includes encoded optimized residuals and corresponding codebook indexes, and to output a compressed video stream suitable for playback. The received media data 108 is for a specific user, such that there is one distinct copy of media data 108 per user. However, and as previously explained, in some embodiments, only a portion of the media data 108 is subject to the one copy per user requirement (e.g., the codebook index may be stored multiple times, once per user, and the optimized residual is only stored once). As can be further seen, the decoder 110 also receives metadata 109 which as previously explained can be stored as a single copy, along with the codebook 105, so that it is available for decoding the optimized residuals. So, for instance, let's continue with the previous example optimized residual of {100 1 101 1 10} that was generated by the encoder 100, as previously explained. Using the metadata 109, the residual decoder 111 decodes the encoded version of this optimized residual to {4 1 5 1 −2} in accordance with the given entropy coding scheme (and binary-to-decimal conversion, in this example case). In this case, the metadata could indicate the dimensions having a negative polarity. Also known from the metadata 109, according to an embodiment, is the total number of dimensions of the residual vector, as well as the length and location of non-zero dimensions of the residual vector. Thus, with this information in hand, the residual decoder 111 further decodes {4 1 5 1 −2} to {4 1 0 0 0 5 0 0 1 −2 0}, which is the original residual vector. Once the corresponding codebook vector is retrieved using the given codebook index, the vector generator 113a of the VQ-decoder 113 recovers the original vector (or a relatively close representation of that original vector) by adding the original residual vector to the retrieved codebook vector. The recovered vectors are provided by the VQ-decoder 113 to the reorderer 115 which operates to combine the sequential vectors to form the original compressed video stream (or a relatively close representation thereof). The reorderer 115 can be implemented using standard vector-to-stream technology. In one example embodiment, reorderer 115 is configured to receive a stream of discrete vectors having a known length and to combine those vectors into an MPEG-compressed video stream, although other compression standards can be used as well.

Figure 2B:
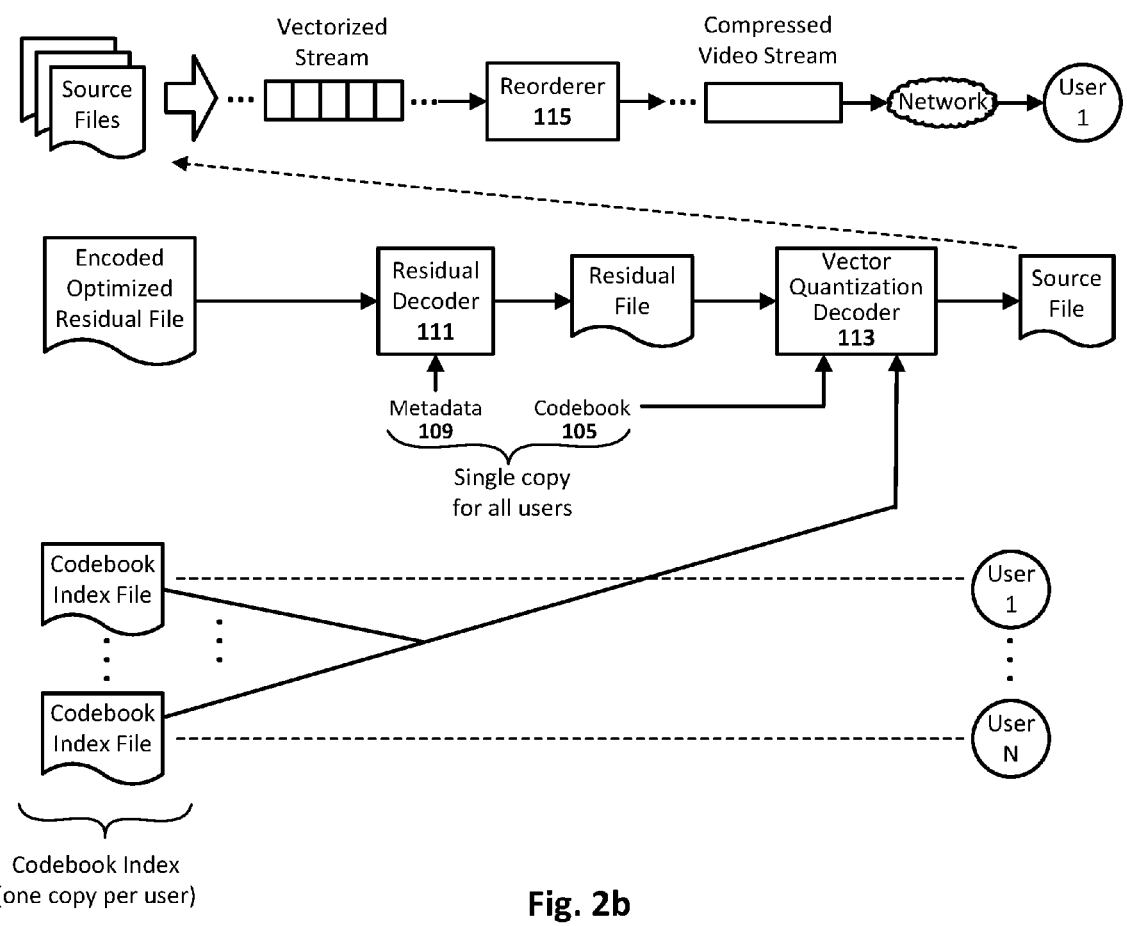
FIG. 2b illustrates example process flow on a content decoder, in accordance with an embodiment of the present disclosure.

FIG. 2b visually depicts one such decoding process, according to an example embodiment. As can be seen, the encoded optimized residual file is received at the residual decoder 111, along with metadata 109, and the residual file or vector is recovered. Note that the residual decoder 111 need not receive the codebook vector index files. In any case, the residual decoder 111 can implement any number of entropy decoding schemes, such as Arithmetic or Huffman coding, to complement the encoding scheme of residual encoder 107. The residual file recovered by the residual decoder 111 is then provided to the VQ-decoder 113, along with the corresponding codebook index files and codebook 105. The original vector or source file (or something relatively close to the original vector or source file) is thus recovered by the VQ-decoder and provided to the reordered 115, which carries out vector-to-stream processing. Note that decoding can be done at the content provider node, prior to streaming the compressed video stream over the communication network, as shown in FIG. 2b. However, in other embodiments, decoding can be carried out at the content consumer node, after streaming the encoded optimized residual files and index files to the appropriate user. In such a case, note that only the target user's selected video content would be transmitted to that user and subsequently decoded by that user's decoder, as will be appreciated.

As will be further appreciated in light of this disclosure, the various modules and components of the encoder 100 and decoder 110, such as the vectorizer 101 and reorderer 115, VQ-encoder 103 and VQ-decoder 113, and residual encoder 107 and residual decoder 111, can be implemented in software, such as a set of instructions (e.g. C, C++, object-oriented C, JavaScript, BASIC, etc) encoded on one or more non-transitory computer readable mediums (e.g., hard drive, solid-state storage, server, or other suitable physical memory), that when executed by one or more processors, cause the various methodologies provided herein to be carried out. A computer program product may include any number of such computer readable mediums, and may be distributed in nature. For instance, functional modules of the encoder 100 can be implemented on a cloud-based server or other suitable computing environment, and the functional modules of the decoder 110 can be implemented on a client-based computing device or suitable playback platform (e.g., television, laptop, projection system, smartphone, tablet, desktop, etc). In other embodiments, the components/modules may be implemented with hardware, such as gate level logic (e.g., FPGAs) or a purpose-built semiconductor (e.g., ASICs), which may also be distributed in some embodiments. Still other embodiments may be implemented with one or more microcontrollers (distributed or not) each having a number of input/output ports for receiving and outputting data and a number embedded routines for carrying out the functionality described herein. Any suitable combination of hardware, software, and firmware can be used.

Methodology

Figure 3A:
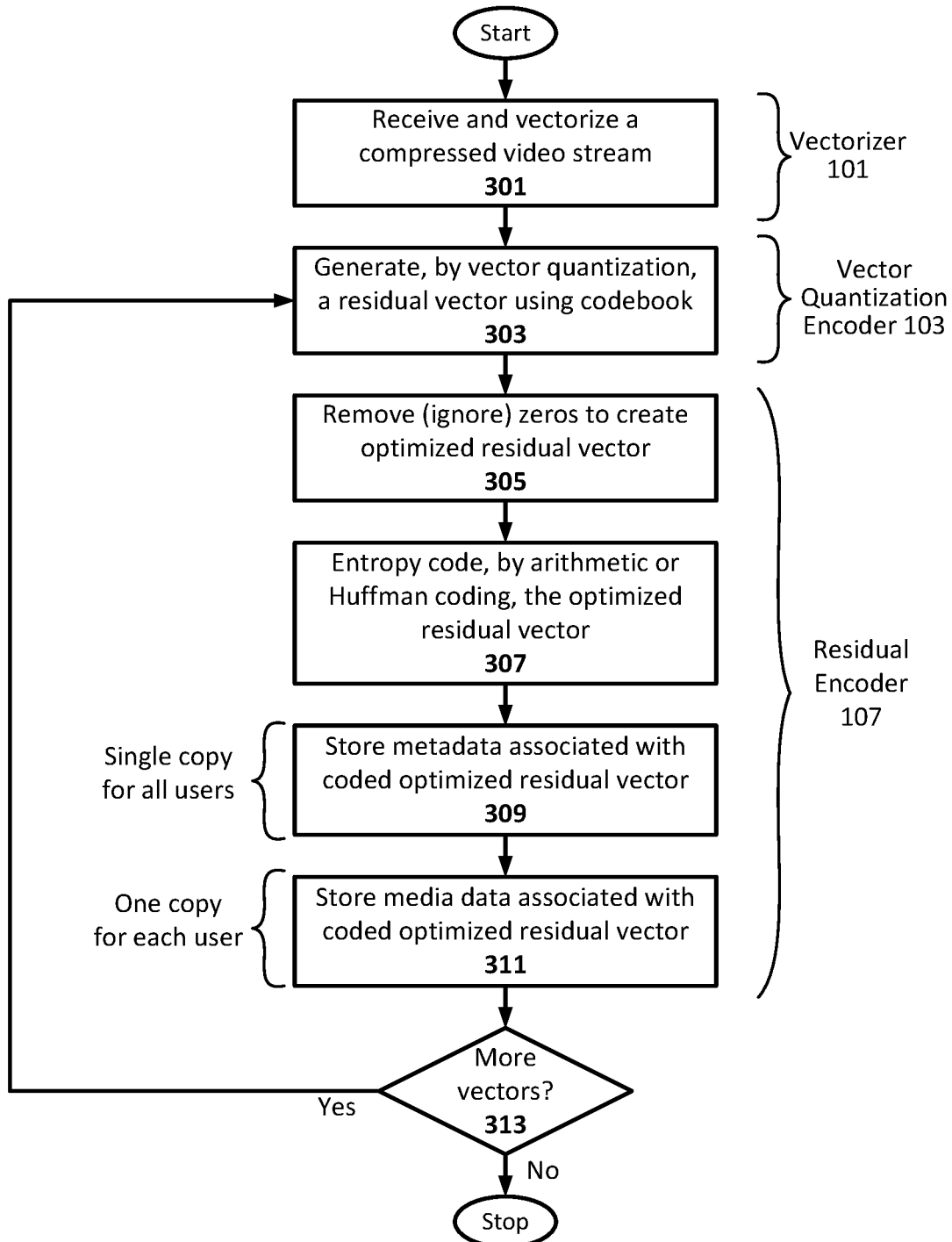
FIG. 3a is a flowchart illustrating a method for encoding digital video content in accordance with an embodiment of the present disclosure.

FIG. 3a is a flowchart illustrating a method for encoding digital video content in accordance with an embodiment of the present disclosure. As can be seen, the method is described with reference to the encoder 100 of FIG. 1. However, any number of encoder configurations can be used to implement the method, as will be appreciated in light of this disclosure. Further note that the various functions depicted in the method do not need to be assigned to the specific example modules shown. For instance, storing of metadata and media data at 309 and 311, respectively, may be carried out, for example, by a dedicated storing module or some other component that is separate and distinct from the residual encoder 107 that carries out the entropy coding at 307. To this end, the example methodology depicted is provided to give one example embodiment and is not intended to limit the methodology to any particular physical or structural configuration.

The method commences at 301 with receiving and vectorizing a compressed video stream. In one example case, the compressed video stream is an MPEG-compressed video stream, although any suitable compression standard can be used that produces a compressed video stream that can be vectorized. The method continues at 303 with generating, by vector quantization, a residual vector using a codebook. In one such embodiment, such encoding or vector quantizing includes computing the difference between the input vector and the chosen codebook vector, and storing that difference value as the residual vector along with a codebook index of the chosen codebook vector. For purposes of decoding (which may occur at the transmitting node or the receiving node, as previously explained), the residual vectors are added back to the codebook vector, which can be looked up or otherwise identified using the stored codebook index. Thus, according to one such embodiment, the post-VQ encoded data is written as series of codebook indexes and residual vectors. Note that when a representative codebook is used, the distortion post-VQ (i.e., the residual vector values) are minimized or otherwise tend to be smaller. In other words, a codebook may be considered "representative" when the accuracy of the codebook is such that the given codebook vectors tend to be not much different from the given input vectors being subjected to VQ, which in turn yields residual vectors that tend to be smaller in value. In such a scenario, a majority of the elements (or dimensions) making up a given residual vector tend to be zero with the remainder of the dimensions tending to be a low number. However, there are occasional high error magnitudes (i.e., codebooks are generally not perfect, regardless of how well trained they are). In any case, note that if all the residual vectors are padded to the same size, the compression advantage of the VQ may be negated by largely bloating the residual files.

Thus, the methodology continues at 305 with removing (or otherwise ignoring) zeros to create an optimized residual vector. The method continues at 307 with entropy coding, by Arithmetic or Huffman coding, the optimized residual vector. In addition to the media data included in the output of the methodology, and as will be further appreciated in light of this disclosure, a good deal of metadata is readily apparent or otherwise self-describing and this metadata can be leveraged to further optimize the entropy coding and decoding process. To this end, the method further includes, at 309 and 311, storing metadata associated with the coded optimized residual vector, and storing media data associated with the coded optimized residual vector, respectively. The method continues at 311 with determining if there are more input vectors to process, and if so, the methodology repeats at 303 as shown; otherwise, the method concludes.

Example Use Case

Figure 4D:
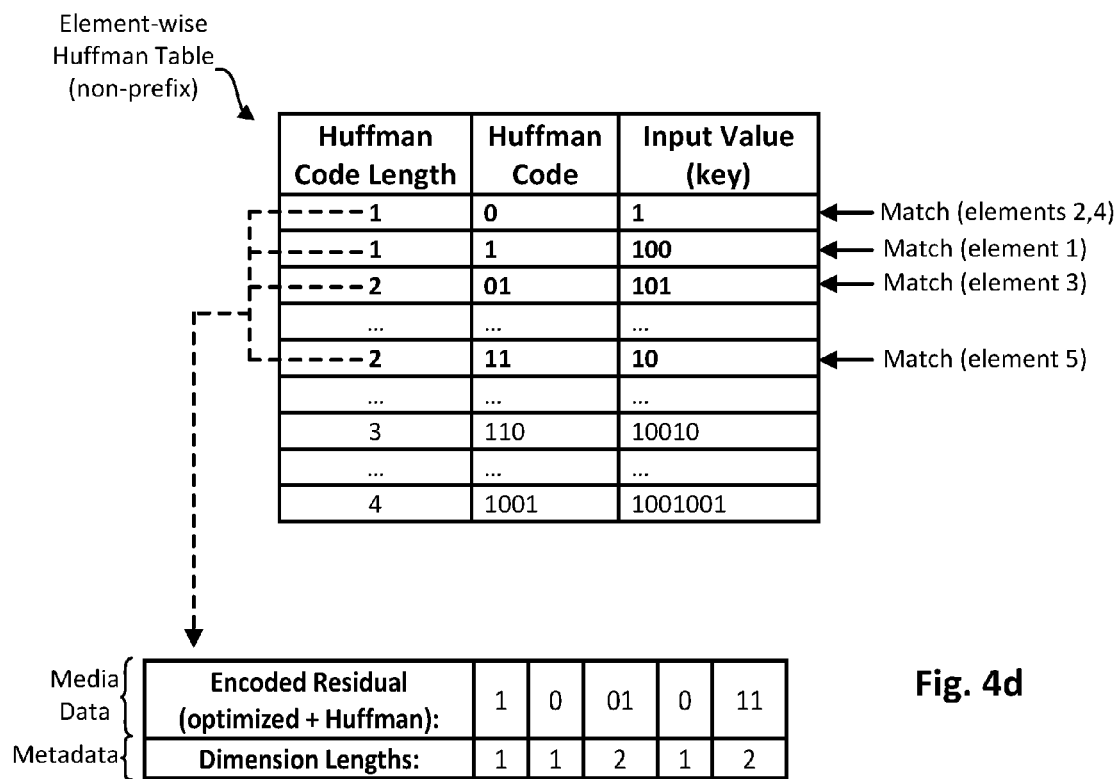
FIG. 4d illustrates a table that can be used for encoding a residual with element-wise non-prefix Huffman encoding in accordance with an embodiment of the present disclosure.

So, for purposes of providing an example process flow using the methodology of FIG. 3a, further reference is made to the example scenario shown in FIG. 4a. As can be seen, an input vector of {0 2 0 0 1 3 2 0 1 3 0} is received at the VQ-encoder, and a most representative codebook vector of {−4 1 0 0 1 −2 2 0 0 5 0} is chosen. Applying vector quantization at 303, the resulting residual (or difference) vector is {4 1 0 0 0 5 0 0 1 −2 0}. Now, applying zero removal at 305, the resulting optimized residual vector is {4 1 5 1 −2}, which translates in binary to {100 1 101 1 10}. Using entropy encoding at 307, the resulting encoded optimized residual vector is generated. For instance, using Huffman coding, {100 1 101 1 10} can be used as an index into a Huffman table to identify the corresponding Huffman code. Alternatively, {100 1 101 1 10} can be used to generate a standard Arithmetic code. For purposes of simplicity, assume the encoded optimized residual vector is represented by {100 1 101 1 10}. Thus, in this example case, the media data includes the encoded optimized residual vector of {100 1 101 1 10}, along with the index of the chosen representative codebook vector (which is known from the codebook) and is {0 1 1 1 1 0 1 1 1 1 0} in this example case. Further examples of how a given optimized residual vector may be encoded are provided with respect to FIGS. 4b-d.

As can be further seen from the example scenario depicted in FIG. 4a, a robust set metadata is known or otherwise readily determinable and can be stored in a single common copy and made available to the decoding process, thereby allowing encoding optimizations to be made, as previously explained. As will be appreciated in light of this disclosure, the metadata that is stored and used can vary from one embodiment to the next, and the example set depicted in FIG. 4a is not intended to imply that every embodiment must include all the depicted metadata. Clearly, this is not the case, and a subset of the depicted metadata can be just as effective, as will be further appreciated in light of this disclosure. Depending on the encoding schemes used, other types of metadata that can be exploited to optimize the encoding and decoding processes (and the compression achieved) will be apparent. For instance, as previously explained, in some embodiments, the metadata need not include any residual length (before entropy encoding) per dimension or length for the overall vector. Likewise, the metadata need not include location of the non-zero elements if the length of the zero elements is stored as zero, meaning that all dimension lengths of the optimized residual (or encoded optimized residual, as the case may be) are determinable, including both zeros and non-zeros, such as shown in FIG. 4a. Likewise, the metadata need not include any length data for the un-optimized residual vectors.

In any case, with further reference to FIG. 4a, the metadata of this example case includes the length of each non-zero dimension of the encoded optimized residual vector, as well as the location of each those non-zero dimensions within the overall (un-optimized) vector and the total number of dimensions in the overall (un-optimized) residual (which is known from the codebook vector dimension, for instance). So, continuing with the previous example scenario, the overall (un-optimized) encoded residual vector includes a total of eleven dimensions, six of which are zeros at positions 3, 4, 5, 7, 8, and 11, and the remaining five dimensions at positions 1, 2, 6, 9, and 10 are non-zeros of {100 1 101 1 10} having respective lengths of 3, 1, 3, 1, and 2 (i.e., the length is measured in bits in this example). In addition, the length recorded for each of the zero dimensions is recorded as 0. Because each zero and non-zero dimension of the overall (un-optimized) encoded residual vector are represented in the dimension length metadata, the location of each dimension within the overall (un-optimized) encoded residual vector is also known from the stored metadata. As will be appreciated, one benefit of knowing these locations and lengths is that no code prefix restriction is needed (where no one code can be the prefix of another code, to ensure proper decoding). As can be further seen in FIG. 4a, the metadata also includes the sign of each non-zero dimension, which in this example case, indicates that the dimension at the penultimate position of the overall (un-optimized) is negative. The codebook ID (CB-77, in this example case) is also known and included in the stored metadata. This ID can be used, for example, to recall the correct codebook during the decoding process, assuming there are multiple codebooks available. In addition, the codebook index length is known and can be stored with the metadata, and is twelve bits in this example case; however, given that this codebook index length is known from the codebook itself, it need not be included in the metadata. Also known and saved with the metadata are the lengths of the residual vector in both its un-optimized and optimized forms, and in this example embodiment are sixteen bits and ten bits, respectively. Other embodiments need not include the metadata describing the un-optimized forms. Knowing such index lengths and residual vector lengths is helpful, for instance, because it can be used to simplify the transmission of the media data. For instance, the code vector indexes of the media data can be run together without any further structure so as to provide a continuous large string that can then be decoded back into its constituent parts using the known lengths of the individual indexes making up the large string. In a similar fashion, the encoded optimized residual vectors of the media data can be run together without any further structure so as to provide a continuous large string that can then be decoded back into its constituent parts using the known lengths of the individual residual vectors making up that large string. Note that the beginning of the first index of the continuous string can be identified or otherwise indicated, for example, by a start flag or field, or other indicia marking the start of the given string.

A number of additional benefits attributable to recording metadata as provided herein will be apparent in light of this disclosure. First, to exploit the low distortion or magnitude of the residual errors (low distortion generally refers to a relatively high occurrence of dimensions having a zero value), the length of each dimension of the residual vector can be signaled in the metadata. Consequentially, the dimensions with value 0 can be signaled with length 0 in the metadata, thereby saving one bit from the residual file of the media data (i.e., for each 0 removed from the un-optimized residual vector, one bit is eliminated from the encoded optimized residual vector that is stored, one copy per user). For instance, and as previously explained, an un-optimized residual error vector of {4 1 0 0 0 5 0 0 1 −2 0} can be represented as {100 1 101 1 10} (media data) and the lengths of each dimension can be represented as {3 1 0 0 0 3 0 0 1 2 0} (metadata).

Also, in the case where all the dimensions of a given residual vector are 0, the metadata would still indicate the length of the codebook index as previously explained, but the length of the residual vector could be stored as simply 0 thereby signaling no non-zero residual elements. Recall that if a residual vector is zero, then the codebook vector is a perfect match to the input vector being compressed. Thus, the media data that is stored (one copy per user) need not include that particular residual vector; rather, the decoding node can simply use the codebook index to retrieve the corresponding codebook vector to recover the original input vector. Given that the number of the 0 residual vectors is high when the codebook vectors truly represent the input vectors, a substantial storage space savings can be achieved when coding those well-represented input vectors.

Thus, as will be appreciated in light of this disclosure, zero removal combined with the leveraging of relevant metadata can be used to facilitate the compaction of residual vector data, and the resulting structure in the non-zero part of the residual vectors lends itself better for compression than when interspersed with zero values. A significant improvement in compression can be achieved. As such, storage efficiency may be increased, even for cases where the one copy per user requirement applies. Likewise, transmission efficiency may be increased, as less media data is transmitted. As will be further appreciated in light of this disclosure, the metadata can include, for example, data relevant to just the encoded optimized residual vector, or both the encoded optimized residual vector and the pre-coding optimized residual vector, and even the un-optimized residual vector if so desired. In some embodiments, only the minimum amount of metadata needed to decode the given encoded optimized residual vectors is stored.

Huffman Coding Optimizations

As is generally known, Huffman coding refers to a technique for assigning binary codes to symbols (or vector dimensions, as the case may be) that reduces the overall number of bits used to encode a typical string of those symbols. For example, if letters are used as symbols and the frequency of occurrence of those letters in typical strings is known, then each letter can be encoded with a fixed number of bits, such as in ASCII codes. Huffman coding further recognizes that a more efficient approach is to encode more frequently occurring letters (such as vowels) with smaller bit strings, and less frequently occurring letters such as x and z with longer bit strings.

As is known, a constraint on standard Huffman coding is related to the notion that the smaller codes assigned to more frequently occurring symbols cannot be a prefix of the larger codes; otherwise, decoding becomes difficult. For instance, if a code 01 is assigned for 'a' and code 011 is assigned for 'z', then successfully decoding a string that begins with 011 is not possible given the lack of clarity as to whether an 'a' or a 'z' is being decoded. So, the standard Huffman coding scheme takes each symbol and its weight (i.e., frequency of occurrence) and generates encodings for each symbol taking account of the weights of each symbol, such that higher weighted symbols have fewer bits in their encoding. To ensure the prefix restriction is met, a Huffman encoding is normally computed by first creating a tree of nodes or so-called tree map. This tree map generation is a processor-intensive routine that can add greatly to computation time.

However, and as will be appreciated in light of this disclosure, metadata such as that discussed with reference to FIGS. 1c and 4a can be leveraged to avoid the need for the prefix constraint. Specifically, the codes used to encode the optimized residual vector (media data) are not required to satisfy the prefix requirement, since the length of the code (metadata) is stored for decoding. For instance, and with reference to the previous example, an un-optimized residual error vector of {4 1 0 0 0 5 0 0 1 −2 0} can be optimized to {100 1 101 1 10} (media data) as previously explained, which can in turn be Huffman coded using look-up or so-called Huffman table. The bit lengths of each dimension can be respectively represented as {3 1 0 0 0 3 0 0 1 2 0} (metadata); likewise, the length of the Huffman code is known. For instance, {100 1 101 1 10} may Huffman code to, for example, 1010 (media data), which has a length of 4 bits (metadata). Thus, the location of each dimension (or bit codes) within the overall encoded optimized residual vector is known as are the number of bits making up each dimension. So, even if one code is a prefix of another code, successful decoding can still be achieved. Additionally, the frequency tree map normally required to ensure compliance with the prefix rule is not required, thereby reducing computation time.

To summarize, a traditional Huffman encoding process generally includes (1) symbol frequency determination, (2) sort the symbols, (3) build the tree map, and (4) assign prefix codes for the symbols. In contrast, a non-prefix Huffman encoding process according to another embodiment of the present disclosure may generally include (1) symbol frequency determination, (2) sort the symbols, and (3) assign non-prefix codes for the symbols. Thus, a non-prefix Huffman can be used to avoid building the tree map. In some such example cases, an improvement of 0.5 bits/symbol or about 25% have been observed. All possible bit combinations for each word length can be used. In one such example, the possible codes are: 0, 1, 00, 01, 10, 11, 000, 001 . . . . Further note that the Huffman table may also be smaller as only the keywords in descending order are needed to be in the table as the codes are always the same. Further details will now be provided in the context of example residual compression schemes using Huffman-based coding schemes, with reference to FIGS. 3b-c and 4b-d.

Figure 3B:
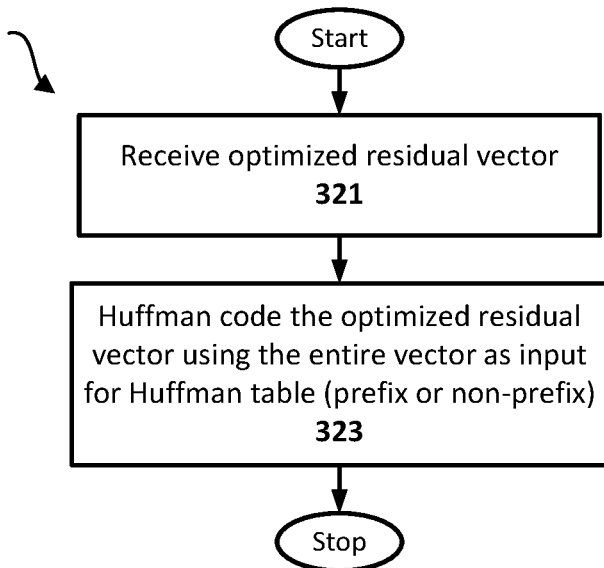
FIG. 3b is a flowchart illustrating a method for vector-wise Huffman encoding a residual vector in accordance with an embodiment of the present disclosure.

FIG. 3b is a flowchart illustrating a method for vector-wise Huffman encoding a residual vector to further compress the residual vector data, in accordance with an embodiment of the present disclosure. As can be seen, the methodology generally includes receiving 321 an optimized residual vector. The methodology continues with Huffman coding 323 the residual vector using the entire vector as input for the Huffman table to thereby generate an encoded optimized residual vector. The Huffman code may be prefix based or non-prefix based (prefix-free). As previously noted, a Huffman coding scheme treats input data as a set of symbols, which in the context of a VQ-encoded compressed video stream would naturally mean that each element or dimension of a given residual vector can be treated as a symbol. Thus, this type Huffman coding is generally referred to herein as element-wise Huffman (because it treats the residual vector input as a set of elements), and may be used in some embodiments. However, according to the embodiment shown in FIG. 3b, note that the entire vector representation is treated as one symbol for Huffman encoding, generally referred to herein as vector-wise Huffman (because it operates on the residual vector as a whole rather than elements of that vector). Thus, continuing with the above example use case, instead of using five separate keys (a key is effectively an index into the Huffman table) for the optimized residual vector of {4, 1, 5, 1, and −2}, the individual codes are run together to provide one key that represents the optimized residual of {1001101110}. Although this may have the effect of bloating the Huffman table, when used in combination with non-prefix Huffman codes gives significant compression improvement.

FIG. 4b shows an example vector-wise Huffman table, according to a prefix based embodiment. As can be seen, the optimized residual value is treated as a single input value or key {100 1 101 1 10} (right column of table, and in this example case matches the Huffman code {000101} (left column of table). Thus, the optimized residual value {1001101110} can be replaced by this Huffman code {000101} (media data).

FIG. 4c shows an example vector-wise Huffman table, according to a non-prefix based embodiment (prefix-free). As can be seen, the optimized residual value is treated as a single input value or key {100 1 101 1 10} (right column of table), and in this example case matches non-prefix Huffman code {1010} (middle column of table). Because this coding scheme is prefix-free, the length of the Huffman code (left column of table), which in this example case is 4 bits, is included in the metadata to facilitate subsequent decoding. Thus, the media data is {1010} and the metadata is 4. Note the Huffman code length can be recorded with other metadata such as that shown in FIGS. 1c and 4a, for instance, but other such metadata is not necessary.

Figure 3C:
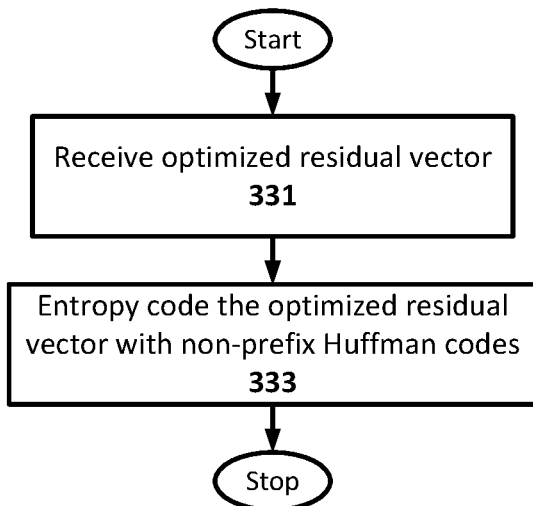
FIG. 3c is a flowchart illustrating a method for element-wise Huffman encoding a residual vector in accordance with an embodiment of the present disclosure.

FIG. 3c is a flowchart illustrating a method for element-wise prefix-free Huffman encoding a residual vector in accordance with another embodiment of the present disclosure. As can be seen, the methodology includes receiving 331 an optimized residual vector, and entropy coding 333 the residual vector with non-prefix Huffman codes, thereby providing an encoded optimized residual vector. Thus, continuing with the above example use case, given the optimized residual vector of {4, 1, 5, 1, and −2}, the individual elements are {100 1 101 1 10}.

FIG. 4d shows an example element-wise Huffman table, according to a non-prefix based embodiment (prefix-free). As can be seen, the optimized residual values are treated as individual input values or keys {100 1 101 1 10} (right column of table), and in this example case match the Huffman codes {1 0 01 0 11} (middle column of table). Thus, these Huffman codes can be used to form the Huffman coded optimized residual vector {1001011}, and the optimized residual vector {100 1 101 1 10} can be replaced by this Huffman code {1001011} (media data). Because this coding scheme is prefix-free, the respective bit lengths of the individual Huffman codes (dimensions), which in this example case are {1, 1, 2, 1, 2}, are included in the metadata to facilitate subsequent decoding. Thus, the media data is {1001011} and the metadata is {1, 1, 2, 1, 2}. Note the Huffman code lengths can be recorded with other metadata shown in FIGS. 1c and 4a, for instance, but other such metadata is not necessary so long as decoding can be successfully carried out.

As will be appreciated in light of this disclosure, given that metadata such as the length of the encoded optimized residual vectors (possibly including their constituent elements/dimensions) are stored in the metadata file, prefix-free Huffman codes can be used instead of regular Huffman encoding. Such non-prefix Huffman codes do not have a self-describing code length, but that is ok given that the code length can be determined from the metadata. Such a prefix-free Huffman coding scheme results in a significant compression benefit. Thus, the residual vectors can be losslessly compressed and stored allowing a higher compression rate. Numerous applications will be apparent in light of this disclosure, including multi-media applications, video processing and playback applications, compression and encoding applications, content access applications, management and transmission applications, streaming media over network applications, content and signal transmission applications, and data stream manipulation applications, to name few examples. As will be further appreciated, the techniques may be implemented in any number of codecs.

Example System

Figure 5:
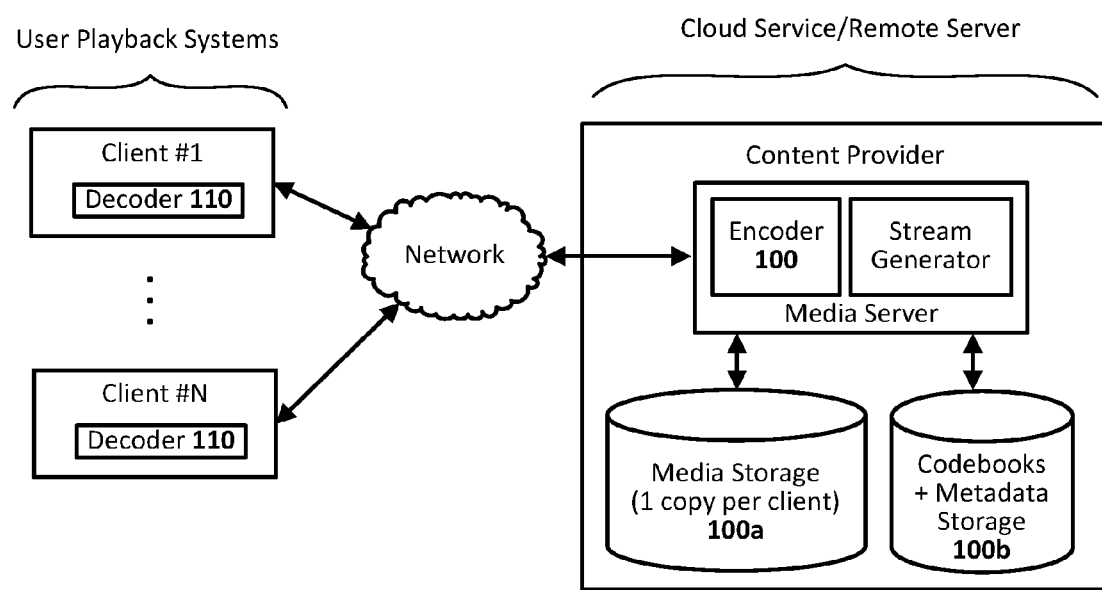
FIG. 5 is a block diagram illustrating an example video content streaming system configured in accordance with an embodiment of the present disclosure.

FIG. 5 is a block diagram illustrating an example video content streaming system configured in accordance with an embodiment of the present disclosure. As can be seen, the system is implemented in a client-server architecture, including a number of client nodes communicatively coupled to content provider nod via a communication network. Such a client-server embodiment may be suitable, for example, for use in the context of an online or cloud-based DVR service that allows a subscriber or other user (client) to record and store video content to a remote DVR (server) for subsequent playback at a time suitable to the user. In this example embodiment, the content provider node includes a media server computer system communicatively coupled with one or more storage mediums. The media server computer system is programmed or otherwise configured with a standard compressed video stream generator and an encoder 100 (as previously discussed herein). The storage mediums in the example case depicted include a first storage for media data (in one embodiment, assume that the one copy per user requirement applies to this data, although such a constraint is certainly not required for all applications provided herein), and a second storage for metadata and codebooks. Although the storage mediums are shown as separate, they need not actually be separate. In still other embodiments, the storage mediums may be implemented with a distributed database that is accessible to the content provider's media server. Likewise, while one media server is shown, any number of media servers can be used to execute the various functionalities provided herein.

In a more general sense, numerous cloud-based back-end configurations can be used to implement typical content provider functionality, which can be supplemented with the residual compression techniques provided herein. The client-based playback system in this example embodiment includes a decoder 110 (as previously discussed herein). In other example embodiments, the decoder 110 may be on the server-side as well, although such a configuration would not be taking advantage of the compression-based savings with respect to transmission time.

In operation, the content provider receives a request to record video content from a user via one of the client-based playback systems and the network. The video content requested for recording may be, for example, a scheduled broadcast or an on-demand purchase. In any case, content provider generates the compressed video stream using the stream generator and may then initiate streaming of the content according to the scheduled broadcast or otherwise at the requested time. In one example case, the compressed video stream is an MPEG-compressed video stream, although any number of compression schemes suitable for streaming video can be used.

In addition to this conventional streaming activity carried out by the content provider, the content provider further acts to process the user's request to record a copy of the content one the user's cloud DVR or other dedicated storage space available for such user requests. To this end, the compressed video stream is processed through the encoder 100 to generate media data for storage in the media storage (user's cloud DVR) and metadata for storage in the codebook and metadata storage, according to an embodiment of the present disclosure. The encoding process carried out by the encoder 100 can be implemented, for example, as previously discussed with reference to FIGS. 1a, 2a, and 3a, including any of the variations provided herein as will be appreciated in light of this disclosure. Recall that the media data stored can be encoded optimized residual vector data.

In response to a request for playback of video content stored in the user's cloud DVR, the media server is further configured to stream the encoded optimized residual vector data to the user over the network. The decoder 110 at the user's playback system can then be used to decode the encoded optimized residual vector data back into the compressed video stream, and present that stream to the user via a display. The decoding process carried out by the decoder 110 can be implemented, for example, as previously discussed with reference to FIGS. 1b, 2b, and 3a, including any of the variations provided herein as will be appreciated in light of this disclosure. The client-based codebook(s) can be updated periodically (e.g., during off-hours), so that decoding can be executed. Metadata can also be transmitted to the client in advance, or in conjunction with transmission of the media data. As previously explained, the decoder 110 may also be implemented at the content provider node, if so desired. In such a case, rather than streaming the encoded optimized residual vector data, the regularly compressed video stream could be streamed to the user's client.

The user's client can be implemented with any suitable computing device (e.g., laptop, desktop, tablet, smartphone, etc) or other playback system (e.g., television and set-top box arrangement, monitor and game console arrangement, etc). The network may include, for instance, a local area network (LAN) operatively coupled to the Internet, or a cable network, or a satellite network, or any other communication network over which video content can be transmitted. The media server can be implemented with one or more server computers configured to receive and process user requests and to provision content. The storage mediums can be any suitable non-volatile storage.

Example Embodiments

Numerous example embodiments will be apparent, and features described herein can be combined in any number of configurations.

Example 1 includes a method for encoding digital video content. The method includes: vectorizing a compressed video stream to provide a plurality of vectors, generating, by vector quantization using a codebook vector from a codebook, a residual vector for a vector included in the plurality of vectors; removing zeros from the residual vector to create an optimized residual vector; entropy coding the optimized residual vector to produce a coded optimized residual vector; storing metadata associated with the coded optimized residual vector, the metadata including at least one of a length of the coded optimized residual vector and a length of each dimension of the coded optimized residual vector; and storing media data associated with the coded optimized residual vector, the media data including an index corresponding to the codebook vector used to generate the residual vector.

Example 2 includes the subject matter of Example 1, and further includes repeating the method until each vector included in the plurality of vectors has been processed into a corresponding coded optimized residual vector.

Example 3 includes the subject matter of Example 1 or 2, wherein the compressed video stream is an MPEG-compressed video stream.

Example 4 includes the subject matter of any of the previous Examples, wherein entropy coding the optimized residual vector to produce a coded optimized residual vector includes at least one of Arithmetic coding and Huffman coding.

Example 5 includes the subject matter of any of the previous Examples, wherein entropy coding the optimized residual vector to produce a coded optimized residual vector includes vector-wise Huffman coding.

Example 6 includes the subject matter of any of the previous Examples, wherein entropy coding the optimized residual vector to produce a coded optimized residual vector includes vector-wise prefix-free Huffman coding.

Example 7 includes the subject matter of any of Examples 1 through 4, wherein entropy coding the optimized residual vector to produce a coded optimized residual vector includes element-wise prefix-free Huffman coding.

Example 8 includes a computer program product comprising one or more non-transitory computer readable mediums encoded with instructions that when executed by one or more processors cause a process to be carried out for encoding digital video content, the process comprising the method of any of Examples 1 through 7.

Example 9 includes a system for encoding digital video content, the system comprising: a storage facility; one or more processors configured to: vectorize a compressed video stream to provide a plurality of vectors; generate, by vector quantization using a codebook vector from a codebook, a residual vector for a vector included in the plurality of vectors; remove zeros from the residual vector to create an optimized residual vector; entropy code the optimized residual vector to produce a coded optimized residual vector; store, in the storage facility, metadata associated with the coded optimized residual vector, the metadata including at least one of a length of the coded optimized residual vector and a length of each dimension of the coded optimized residual vector; and store, in the storage facility, media data associated with the coded optimized residual vector, the media data including an index corresponding to the codebook vector used to generate the residual vector.

Example 10 includes the subject matter of Example 9, wherein the one or more processors are further configured to: repeat each of the generating, removing, entropy coding, and storing until each vector included in the plurality of vectors has been processed into a corresponding coded optimized residual vector.

Example 11 includes the subject matter of Example 9 or 10, wherein the system is part of a cloud-based digital video recorder (DVR) service. Such a service may be, for example, a cable television provider or mass media company, for instance.

Example 12 includes the subject matter of any of Examples 9 through 11, wherein the one or more processors are configured to entropy code the optimized residual vector to produce a coded optimized residual vector by using at least one of Arithmetic coding and Huffman coding.

Example 13 includes the subject matter of any of Examples 9 through 12, wherein entropy coding the optimized residual vector to produce a coded optimized residual vector includes vector-wise Huffman coding.

Example 14 includes the subject matter of any of Examples 9 through 13, wherein the one or more processors are configured to entropy code the optimized residual vector to produce a coded optimized residual vector by using vector-wise prefix-free Huffman coding.

Example 15 includes the subject matter of any of Examples 9 through 12, wherein the one or more processors are configured to entropy code the optimized residual vector to produce a coded optimized residual vector by using element-wise prefix-free Huffman coding.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for encoding digital video content, comprising:
vectorizing a compressed video stream;
generating, by vector quantization using a codebook vector from a codebook, a residual vector for a vector produced as a result of vectorizing the compressed video stream;
removing zeros from the residual vector to create an optimized residual vector having a plurality of elements;
entropy coding the optimized residual vector to produce a coded optimized residual vector having a plurality of codes, such that each element of the optimized residual vector is converted into a corresponding one of the codes, wherein a first one of the codes is a prefix for a second one of the codes;
concatenating the codes that comprise the coded optimized residual vector, thereby producing a single string containing all of the codes;
storing metadata associated with the coded optimized residual vector, the metadata including a length of each of the codes; and storing media data that includes the string and an index corresponding to the codebook vector used to generate the residual vector.

2. The method of claim 1, further comprising repeating the method for each of a plurality of vectors generated by vectorizing the compressed video stream.

3. The method of claim 1 wherein the compressed video stream is an MPEG-compressed video stream.

4. The method of claim 1 wherein entropy coding the optimized residual vector to produce the coded optimized residual vector includes at least one of Arithmetic coding and Huffman coding.

5. The method of claim 1 further comprising:
storing a copy of the media data for each of a plurality of users; and
storing a single copy of the metadata that is associated with the plurality of users.

6. A computer program product comprising one or more non-transitory computer readable mediums encoded with instructions that when executed by one or more processors cause a process to be carried out for encoding digital video content, the process comprising:
vectorizing a compressed video stream;
generating, by vector quantization using a codebook vector from a codebook, a residual vector for a vector produced as a result of vectorizing the compressed video stream;
removing zeros from the residual vector to create an optimized residual vector having a plurality of elements;
entropy coding the optimized residual vector to produce a coded optimized residual vector having a plurality of codes, such that each element of the optimized residual vector is converted into a corresponding one of the codes, wherein a first one of the codes is a prefix for a second one of the codes;
concatenating the codes that comprise the coded optimized residual vector, thereby producing a single string containing all of the codes;
storing metadata associated with the coded optimized residual vector, the metadata including a length of each of the codes; and
storing media data that includes the string and an index corresponding to the codebook vector used to generate the residual vector.

7. The computer program product of claim 6, the process further comprising repeating the process for each of a plurality of vectors generated by vectorizing the compressed video stream.

8. The computer program product of claim 6 wherein entropy coding the optimized residual vector to produce the coded optimized residual vector includes at least one of Arithmetic coding and Huffman coding.

9. The computer program product of claim 6 wherein the process further comprises:
storing a copy of the media data for each of a plurality of users; and
storing a single copy of the metadata that is associated with the plurality of users.

10. A system for encoding digital video content, the system comprising:
a storage facility; and
one or more processors configured to:
vectorize a compressed video stream;
generate, by vector quantization using a codebook vector from a codebook, a residual vector for a vector produced as a result of vectorizing the compressed video stream;
remove zeros from the residual vector to create an optimized residual vector having a plurality of elements;
entropy code the optimized residual vector to produce a coded optimized residual vector having a plurality of codes, such that each element of the optimized residual vector is converted into a corresponding one of the codes, wherein a first one of the codes is a prefix for a second one of the codes;
concatenate the codes that comprise the coded optimized residual vector, thereby producing a single string containing all of the codes;
store, in the storage facility, metadata associated with the coded optimized residual vector, the metadata including a length of each the codes; and
store, in the storage facility, media data that includes the string and an index corresponding to the codebook vector used to generate the residual vector.

11. The system of claim 10 wherein the one or more processors are further configured to store metadata and media data derived from each vector included in the plurality of vectors generated by vectorizing the compressed video stream.

12. The system of claim 10 wherein the system is part of a cloud-based digital video recorder (DVR) service.

13. The system of claim 10 wherein the one or more processors are configured to entropy code the optimized residual vector to produce the coded optimized residual vector by using at least one of Arithmetic coding and Huffman coding.

14. The system of claim 10 wherein the one or more processors are configured to
store a copy of the media data for each of a plurality of users; and
store a single copy of the metadata that is associated with the plurality of users.

* * * * *